US009995996B2

(12) United States Patent
Masuda (10) Patent No.: US 9,995,996 B2
(45) Date of Patent: Jun. 12, 2018

(54) COOLING STRUCTURE, LIGHTING OPTICAL SYSTEM, AND PROJECTION-TYPE DISPLAY APPARATUS INCLUDING SUBSTRATE AND PHOSPHOR FORMED ON THE SUBSTRATE TO EMIT FLUORESCENT LIGHT

(71) Applicant: NEC Display Solutions, Ltd., Tokyo (JP)

(72) Inventor: Naoki Masuda, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days. days.

(21) Appl. No.: 15/036,034

(22) PCT Filed: Dec. 11, 2013

(86) PCT No.: PCT/JP2013/083170
§ 371 (c)(1),
(2) Date: May 11, 2016

(87) PCT Pub. No.: WO2015/087406
PCT Pub. Date: Jun. 18, 2015

(65) Prior Publication Data
US 2016/0291449 A1  Oct. 6, 2016

(51) Int. Cl.
*G03B 21/16* (2006.01)
*H04N 9/31* (2006.01)
(Continued)

(52) U.S. Cl.
CPC ............... *G03B 21/16* (2013.01); *F21V 5/04* (2013.01); *F21V 7/0091* (2013.01); *F21V 9/08* (2013.01);
(Continued)

(58) Field of Classification Search
CPC ..... G03B 21/204; G03B 21/16; H04N 9/3144
See application file for complete search history.

(56) References Cited

U.S. PATENT DOCUMENTS

| | | | |
|---|---|---|---|
| 6,618,213 B2* | 9/2003 | Inamoto | F04D 17/08 348/743 |
| 6,755,554 B2* | 6/2004 | Ohmae | F21S 10/007 348/743 |

(Continued)

FOREIGN PATENT DOCUMENTS

| | | |
|---|---|---|
| CN | 101393312 A | 3/2009 |
| CN | 102478750 A | 5/2012 |

(Continued)

OTHER PUBLICATIONS

International Search Report (ISR) (PCT Form PCT/ISA/210), in PCT/JP2013/083170, dated Mar. 18, 2014.

(Continued)

*Primary Examiner* — Bao-Luan Le
(74) *Attorney, Agent, or Firm* — McGinn IP Law Group, PLLC.

(57) ABSTRACT

A cooling structure includes a phosphor unit, air-blowing systems that cause cooling air to flow, and a duct structure. The phosphor unit includes a substrate and a phosphor that is formed on the substrate and that emits fluorescent light when irradiated with excitation light. The duct structure guides the cooling air blown from the air-blowing systems to the phosphor unit.

17 Claims, 8 Drawing Sheets

(51) Int. Cl.
*F21V 29/502* (2015.01)
*F21V 29/60* (2015.01)
*F21V 29/61* (2015.01)
*F21V 29/77* (2015.01)
*F21V 29/83* (2015.01)
*F21V 5/04* (2006.01)
*F21V 7/00* (2006.01)
*F21V 9/08* (2018.01)
*F21V 9/16* (2006.01)
*G03B 21/20* (2006.01)

(52) U.S. Cl.
CPC .............. *F21V 9/16* (2013.01); *F21V 29/502* (2015.01); *F21V 29/60* (2015.01); *F21V 29/61* (2015.01); *F21V 29/77* (2015.01); *F21V 29/83* (2015.01); *G03B 21/204* (2013.01); *G03B 21/2013* (2013.01); *H04N 9/3144* (2013.01)

(56) References Cited

U.S. PATENT DOCUMENTS

| | | | | |
|---|---|---|---|---|
| 7,004,604 B2 * | 2/2006 | Ohmae | ................ | F21S 10/007 348/E5.141 |
| 8,057,048 B2 * | 11/2011 | Suzuki | ................... | G03B 21/16 348/335 |
| 8,678,597 B2 * | 3/2014 | Nishimura | ............. | G03B 21/16 353/119 |
| 9,335,616 B2 * | 5/2016 | Lin | ........................ | G03B 21/16 |
| 2002/0003704 A1 * | 1/2002 | Ohmae | ................ | F21S 10/007 362/293 |
| 2003/0095349 A1 * | 5/2003 | Inamoto | ................... | F04D 17/08 359/889 |
| 2004/0095767 A1 * | 5/2004 | Ohmae | ................ | F21S 10/007 362/293 |
| 2007/0236668 A1 * | 10/2007 | Suzuki | ................... | G03B 21/16 353/57 |
| 2007/0273839 A1 * | 11/2007 | Doi | ........................ | G03B 21/16 353/57 |
| 2008/0225239 A1 * | 9/2008 | Tan | ........................ | G03B 21/16 353/61 |
| 2009/0034284 A1 * | 2/2009 | Li | .......................... | H04N 9/315 362/554 |
| 2009/0141248 A1 * | 6/2009 | Suzuki | ................... | G03B 21/16 353/61 |
| 2011/0249457 A1 * | 10/2011 | Jurik | ....................... | F21V 21/15 362/418 |
| 2012/0013854 A1 * | 1/2012 | Nishimura | ............. | G03B 21/16 353/57 |
| 2012/0097376 A1 * | 4/2012 | Lin | ........................ | G03B 21/16 165/121 |
| 2015/0029472 A1 * | 1/2015 | Lin | ........................ | G03B 21/16 353/61 |

FOREIGN PATENT DOCUMENTS

| | | | | |
|---|---|---|---|---|
| FR | 2880432 A1 * | 7/2006 | ............. | G03B 21/16 |
| JP | 2002-090886 A | 3/2002 | | |
| JP | 2003-156796 A | 5/2003 | | |
| JP | 2004-053692 A | 2/2004 | | |
| JP | 2009-134201 A | 6/2009 | | |
| JP | 2011-075657 A | 4/2011 | | |
| JP | 2012-018762 A | 1/2012 | | |
| JP | 2012-078707 A | 4/2012 | | |
| JP | 2012-181309 A | 9/2012 | | |
| JP | 2013-025249 A | 2/2013 | | |
| WO | WO 2010/116444 A1 | 10/2010 | | |
| WO | WO 2012/127554 A1 | 9/2012 | | |

OTHER PUBLICATIONS

Japanese Office Action, dated Apr. 20, 2017, in Japanese Application No. 2017-018201 and Partial English Translation thereof.
Chinese Office Action dated Dec. 16, 2016 with an English translation thereof.

* cited by examiner

COOLING STRUCTURE, LIGHTING OPTICAL SYSTEM, AND PROJECTION-TYPE DISPLAY APPARATUS INCLUDING SUBSTRATE AND PHOSPHOR FORMED ON THE SUBSTRATE TO EMIT FLUORESCENT LIGHT

TECHNICAL FIELD

The present invention relates to a cooling structure of a phosphor unit that contains a fluorescent material that emits fluorescent light when irradiated by excitation light, a lighting optical system and projection-type display apparatus that are provided with this cooling structure, and a cooling method of a phosphor unit.

BACKGROUND ART

In recent years, lighting optical systems are being developed that contain a fluorescent material that emits fluorescent light when irradiated by excitation light. This type of lighting optical system is used in, for example, projection-type display apparatuses.

The lighting optical system disclosed in International Publication No. 2012/127554 (hereinbelow referred to as Patent Document 1) includes a laser light source and a phosphor unit. A phosphor region and a reflection region are formed on one surface of the phosphor unit. The phosphor region has a phosphor that emits fluorescent light of a predetermined wavelength when irradiated by laser light. The reflection region is a region that reflects light. The phosphor unit is configured to freely rotate around an axis of rotation that is orthogonal to the surface on which the reflection region and phosphor region are provided. Laser light is incident to the phosphor unit during the rotation of the phosphor unit, whereby the fluorescent light from the phosphor and laser light that is reflected by the reflection region area are emitted sequentially.

The illuminance of light emitted from the lighting optical system is dependent on the quantity of light that is emitted from the phosphor. One of the characteristics of phosphor is that heat generation reduces light-emitting efficiency. Accordingly, it is preferably to reduce phosphor heat generation in order to reduce any decrease in illuminance of light that is emitted from the lighting optical system.

Phosphor heat generation results from the irradiation of laser light. In the lighting optical system described in Patent Document 1, the phosphor is cooled by air flow received by the phosphor unit itself with the rotation of the phosphor unit. However, it is preferable that the cooling effect of cooling the phosphor is improved.

LITERATURE OF THE PRIOR ART

Patent Documents

Patent Document 1: International Publication No. 2012/127554.

SUMMARY OF THE INVENTION

It is an object of the present invention to provide a cooling structure, a lighting optical system, and a projection-type display apparatus, as well as a cooling method that can improve the cooling effect of a phosphor, which is the issue described above.

The cooling structure according to an exemplary embodiment has a phosphor unit, an air-blowing system that causes cooling air to flow, and a duct structure. The phosphor unit includes a substrate and a phosphor that is formed on the substrate and that produces fluorescent light by the irradiation of excitation light. The duct structure guides cooling air from the air-blowing system to the phosphor unit.

The lighting optical system according to an exemplary embodiment has the above-described cooling structure and an excitation light source that generates excitation light that irradiates the phosphor.

The projection-type display apparatus according to an exemplary embodiment has the above-described lighting optical system, an optical engine that converts light emitted from the lighting optical system to image light, and a projection lens that projects the image light to the outside.

The cooling method according to an exemplary embodiment relates to a method of cooling a phosphor unit that contains a substrate and a phosphor that is formed on the substrate and that produces fluorescent light by the irradiation of excitation light. This cooling method includes directing cooling air against a phosphor unit by way of a duct structure that guides from an air-blowing system to the phosphor unit.

The cooling structure of the above-described configuration or the cooling method enables an improvement of the cooling effect of a phosphor.

BEST MODE FOR CARRYING OUT THE INVENTION

Figure 1:
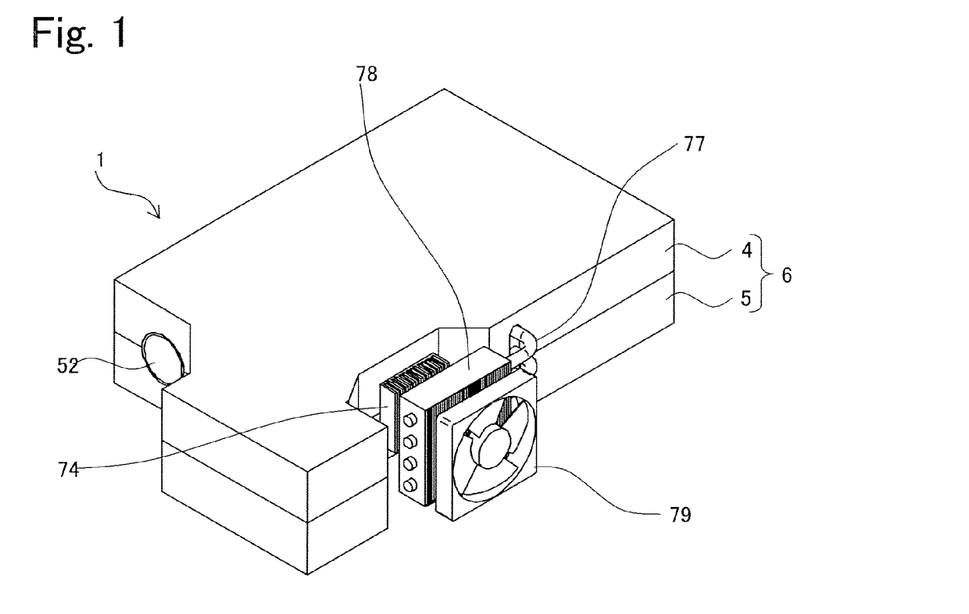
FIG. 1 is a schematic perspective view of a lighting optical system according to an exemplary embodiment.

An exemplary embodiment of the present invention is next described with reference to the accompanying drawings. FIG. 1 is a perspective view of a lighting optical system according to an exemplary embodiment. Lighting optical system 1 is provided with housing 6 that accommodates constituent components such as the phosphor unit and a light source (to be described). Housing 6 may include upper case 4 and lower case 5.

Figure 2:
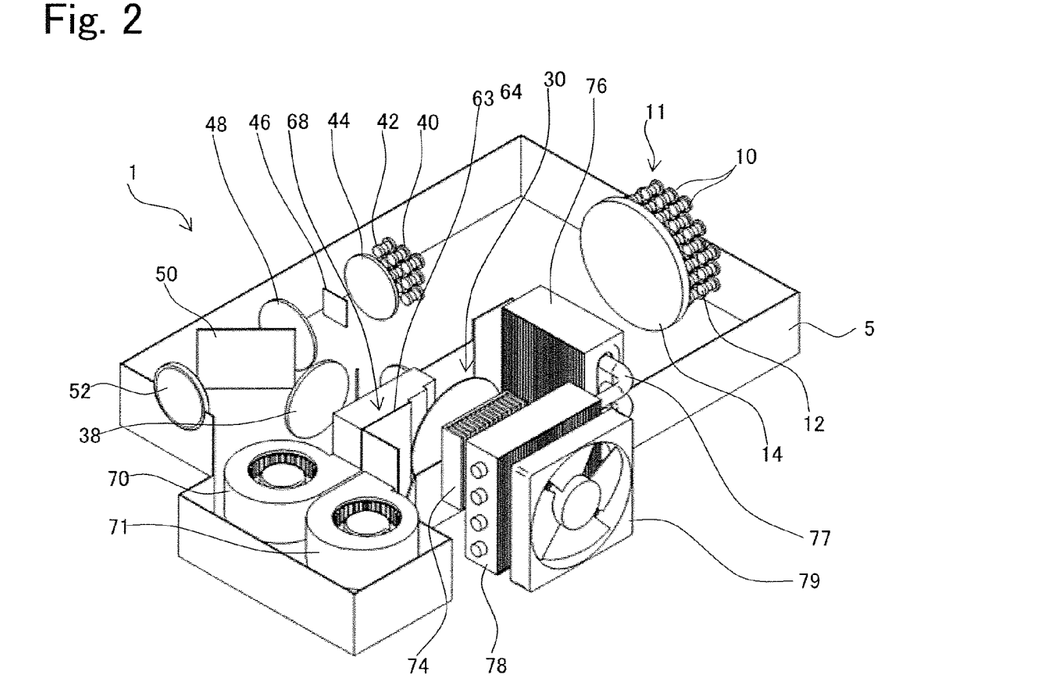
FIG. 2 is a schematic perspective view showing the inner configuration of the lighting optical system.
Figure 3:
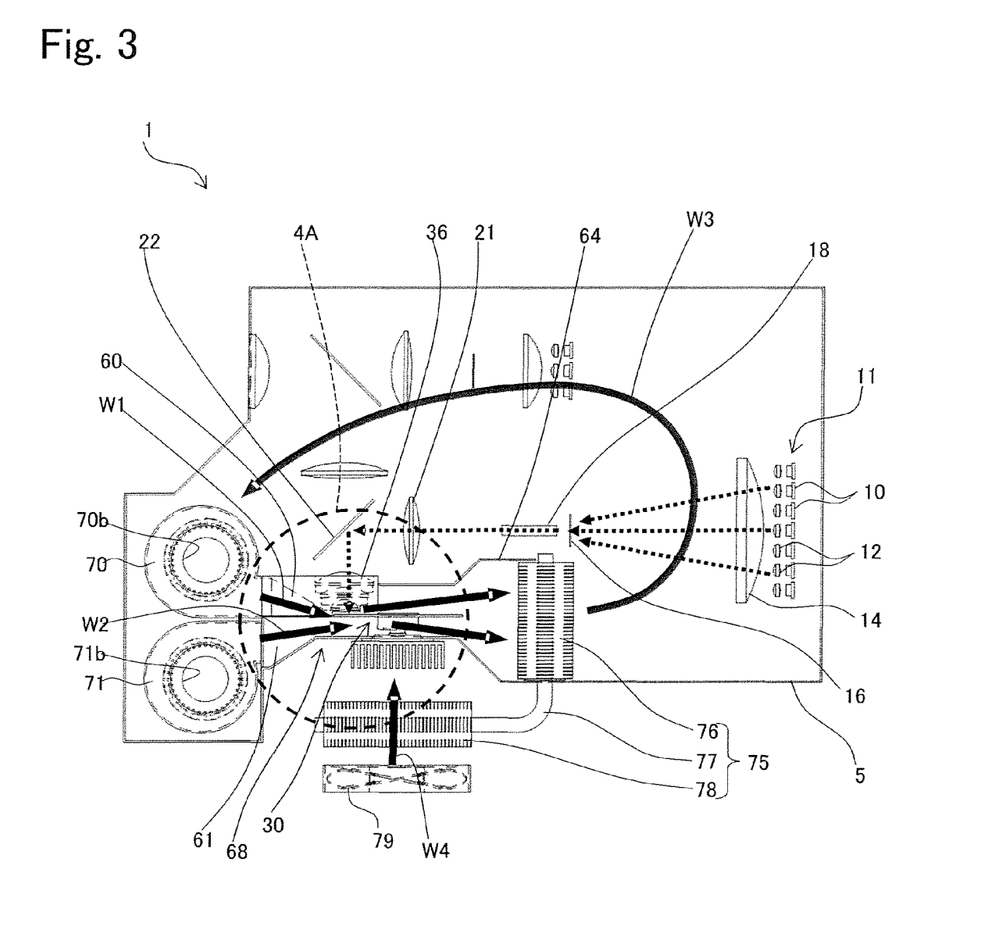
FIG. 3 is a schematic plan view showing the inner configuration of the lighting optical system.
Figure 4:
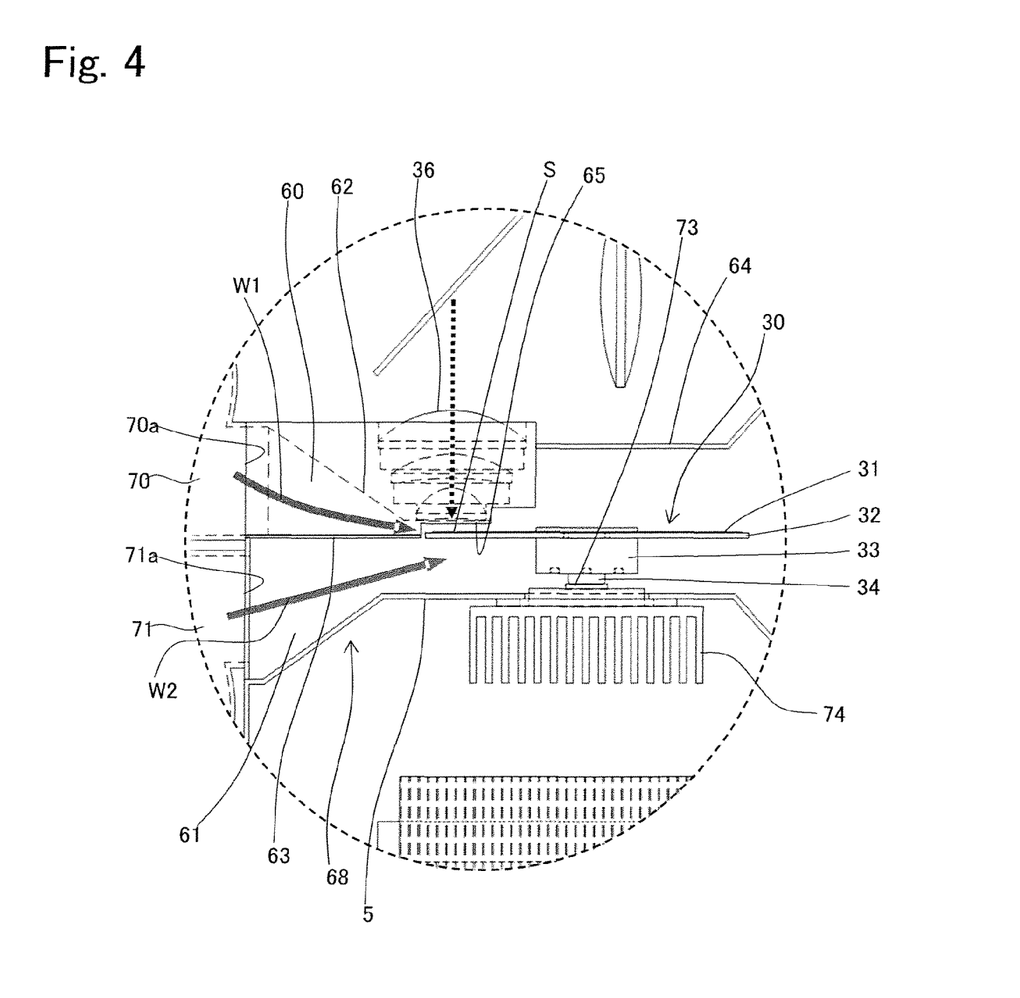
FIG. 4 is a plan view in which the regions of the phosphor unit and duct structure are enlarged in the lighting optical system shown in FIG. 3.
Figure 5:
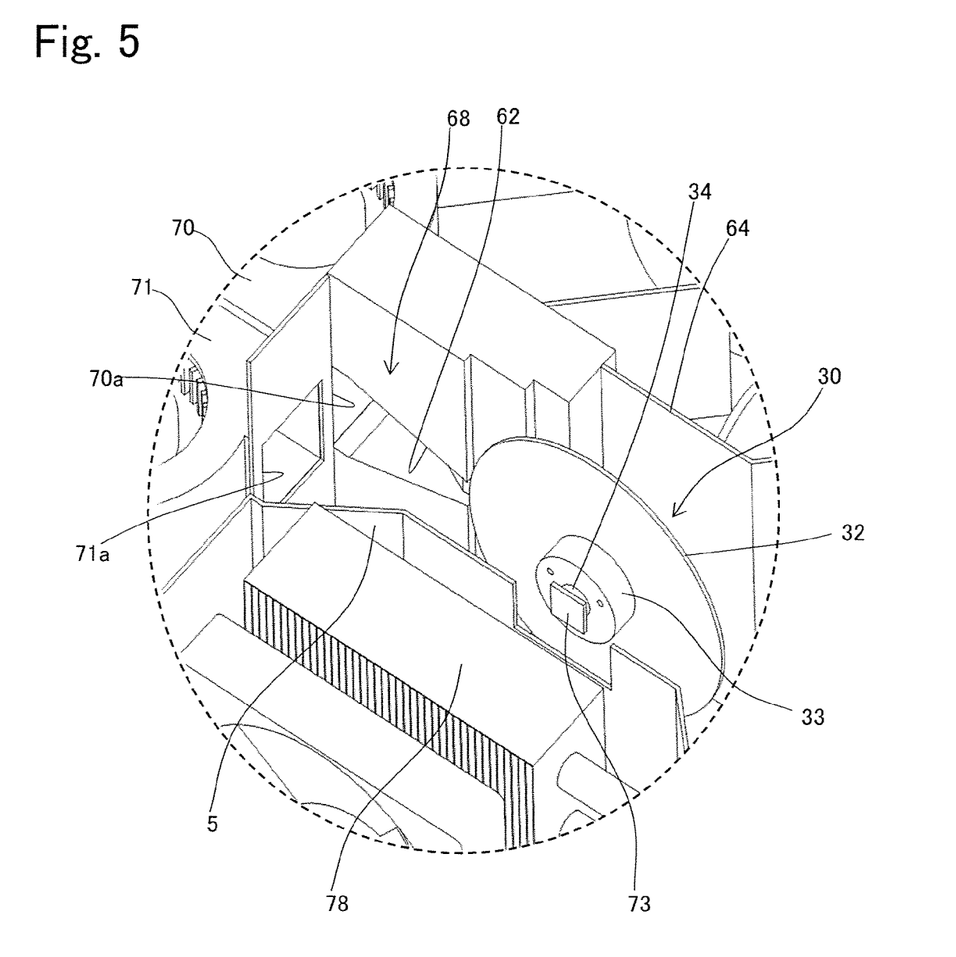
FIG. 5 is a perspective view in which the regions of the phosphor unit and the duct structure are enlarged in the lighting optical system shown in FIG. 3.

FIG. 2 is a perspective view of lighting optical system 1 in which upper case 4 has been removed and shows the inner configuration of lighting optical system 1. FIG. 3 is a plan view of lighting optical system 1 in which upper case 4 has been removed and shows the inner configuration of lighting optical system 1. FIG. 4 is an enlarged view of region 4A shown in FIG. 3, and FIG. 5 is a perspective view in which region 4A shown in FIG. 3 is enlarged. Holders that are used to secure each constituent element in order to make the component easier to see are not shown in FIGS. 2 and 3.

Lighting optical system 1 has phosphor unit 30 that contains phosphor 31 that emits fluorescent light when irradiated by excitation light and excitation light source 11 that produces excitation light that irradiates phosphor 31. The excitation light that is emitted from excitation light source 11 is irradiated into phosphor 31 that is provided in phosphor unit 30 by way of various optical components 12, 14, 16, 18, 21, 22 and 36.

Excitation light source 11 may contain a plurality of laser light sources 10 arranged in matrix form. Excitation light source 11 is able to produce excitation light that is formed by mixing the laser light that is emitted from the plurality of laser light sources 10. Laser light source 10 preferably emits blue laser light having a blue wavelength. Laser light source 10 may be, for example, a laser diode.

Next, FIGS. 4 and 5 in particular are described regarding an example of the actual configuration of phosphor unit 30. Phosphor unit 30 has substrate 32 and phosphor 31 formed on one surface of substrate 32. Substrate 32 is preferably made from a material having high heat conductivity such as aluminum.

Substrate 32 may be shaped as a disk. Substrate 32 is preferably supported so as to freely rotate around an axis of rotation that is orthogonal to the surface of the substrate. In this case, phosphor unit 30 may be provided with drive motor 33 that drives the rotation of substrate 32 on which phosphor 31 is formed. Drive motor 33 is preferably arranged in an area on the opposite side of the surface of substrate 32 on which phosphor 31 is formed.

The excitation light that is emitted from excitation light source 11 locally irradiates portion S on phosphor 31. The rotation of substrate 32 during irradiation of the excitation light can prevent the excitation light from constantly irradiating the same location of phosphor 31, whereby excessive heating of phosphor 31 during irradiation of the excitation light can be prevented. Phosphor 31 and substrate 32 are cooled by the air flow due to the rotation of substrate 32.

In the present exemplary embodiment, phosphor 31 is a substance that emits yellow fluorescent light that contains red to green wavelengths. Phosphor 31 may otherwise also be a substance that emits any fluorescent light according to the intended use. Alternatively, a plurality of phosphors that produce fluorescent light of mutually different wavelengths may also be formed on substrate 32. In this case, fluorescent light of mutually differing wavelengths is sequentially emitted from phosphor unit 30 by sequentially irradiating excitation light upon the plurality of phosphors during the rotation of substrate 32.

The cooling structure of phosphor unit 30 is next described with reference to FIGS. 2-5. Lighting optical system 1 includes air-blowing systems 70 and 71 that cause the flow of cooling air that cools phosphor unit 30 and duct structure 68 that guides the cooling air from air-blowing systems 70 and 71 to phosphor unit 30. Duct structure 68 guides the cooling air from air-blowing systems 70 and 71 to phosphor unit 30 and thereby improves the cooling effect of phosphor unit 30. The actual structure of duct structure 68 is open to variation.

A preferable embodiment of the structure of duct structure 68 is next described in detail with reference to FIGS. 2-5. The outer walls of duct structure 68 may be realized by a portion of housing 6 and external wall member 64. Phosphor unit 30 is preferably arranged inside duct structure 68. Excitation light source 11 and other optical components may be provided outside duct structure 68. In this case, duct structure 68 may include window 65 that allows the passage of excitation light for irradiating phosphor 31 with excitation light from excitation light source 11. Condensing lens system 36 that condenses excitation light toward phosphor 31 may be arranged at the location of window 65 of duct structure 68.

Duct structure 68 may include first flow path 60 by which cooling air flows and second flow path 61 by which cooling air flows. In addition, lighting optical system 1 preferably has first air-blowing apparatus 70 that causes cooling air to flow into first flow path 60 and second air-blowing apparatus 71 that causes cooling air to flow into second flow path 61. Instead of this configuration, a single shared air-blowing apparatus may be provided that causes cooling air to flow into both of first flow path 60 and second flow path 61.

First flow path 60 extends from cooling air nozzle 70a of first air-blowing apparatus 70 toward one end of substrate 32 of phosphor unit 30. First flow path 60 guides cooling air W1 from first air-blowing apparatus 70 to the surface of substrate 32 on which phosphor 31 is formed. First flow path 60 preferably has constricted portion 62 in which the width of the flow path becomes progressively smaller towards substrate 32 of phosphor unit 30. The end of constricted portion 62 may be directed toward irradiation spot S of excitation light.

Cooling air W1 that is expelled from first air-blowing apparatus 70 passes along first flow path 60 and is expelled toward phosphor 31. When first flow path 60 is constricted with progression downstream in the direction of the flow of cooling air W1, the flow speed of cooling air W1 that flows from first flow path 60 increases. In this way, the local cooling realized by cooling air W1 having a high flow speed can improve the cooling effect of portions having high heating concentration, i.e., irradiation spot S of excitation light.

Second flow path 61 extends from cooling air nozzle 71a of second air-blowing apparatus 71 toward the end of substrate 32 of phosphor unit 30. Second flow path 61 guides cooling air W2 from second air-blowing apparatus 71 to a region of the surface of substrate 32 on the side opposite the side on which phosphor 31 is formed. In this way, cooling air W2 that has passed along second flow path 61 can cool drive motor 33 and the surface of substrate 32 on which phosphor 31 is not formed. In addition, drive motor 33 is preferably arranged in second flow path 61.

Second flow path 61 need not have constricted portion 62 as in first flow path 60. In other words, second flow path 61 may have a flow path width that is wider than constricted portion 62 of first flow path 60. From the standpoint of the cooling effect, overall cooling while avoiding, as much as possible, any reduction of the amount of cooling air of cooling air W2 is preferable for the rear side of phosphor unit 30 that is heated with relatively low heating concentration over a wide range.

When the flow speed and amount of cooling air are varied in first flow path 60 and second flow path 61, as described hereinabove, plate-shaped partition member 63 may be provided that forms a partition between first flow path 60 and second flow path 61. In FIG. 5, partition member 63 is not shown in the interest of facilitating visibility.

One end of partition member 63 preferably approaches one end of substrate 32 of phosphor unit 30, whereby partition member 63 prevents mixing of first cooling air W1 that passes along first flow path 60 with second cooling air W2 that passes along second flow path 61. Further, as shown in FIG. 4, substrate 32 of phosphor unit 30 is preferably arranged so as to form a partition between first flow path 60 and second flow path 61. In this case, the surface of substrate 32 on which phosphor 31 is formed faces first flow path 60 and the surface that is on the opposite side of the surface on which phosphor 31 is formed faces second flow path 61.

Heat exchanger 75 may be provided on the side that is on the downstream side from phosphor unit 30 in the direction of the flow of cooling air W1 and W2 to lower the temperature of heated air. Heat exchanger 75 is preferably provided at the outlet portion of duct structure 68, whereby the temperature of cooling air that has been heated in phosphor unit 30 can be lowered.

More specifically, heat exchanger 75 may have heat receiver 76 that receives heat, heat discharger 78 that discharges heat, and heat pipe 77 that thermally connects heat receiver 76 and heat discharger 78. Heat receiver 76 is provided in the outlet portion of duct structure 68, and heat discharger 78 is provided outside housing 6. In this way, the heat that is received by heat receiver 76 is discharged to the outside of housing 6 through heat pipe 77.

When phosphor unit 30 is arranged inside duct structure 68, heated air flows toward heat receiver 76 of heat exchanger 75 without being spread to other spaces. In this way, temperature increase can be prevented in other spaces inside housing 6 of lighting optical system 1, in particular, spaces in which excitation light source 11 or other optical components are arranged.

Air W3 that has been cooled in heat receiver 76 of heat exchanger 75 circulates inside housing 6 and again reaches inflow ports 70b and 71b of air-blowing apparatuses 70 and 71. Air that reaches the inflow ports 70b and 71b of air-blowing apparatuses 70 and 71 again flows into duct structure 68 as cooling air. This circulation of cooling air effectively cools phosphor unit 30.

First laser light source 10 is preferably arranged in housing 6 such that laser light is not dispersed to the outside. In this case, circulating the cooling air as described hereinabove can prevent the rise of temperature inside housing 6.

Bearing 34 of drive motor 33 of phosphor unit 30 is preferably connected to heat sink 74 with heat-conductive sheet 73 interposed. In FIG. 5, heat sink 74 is not shown in the interest of facilitating visibility. Heat sink 74 may be arranged outside housing 6. Heat sink 74 enables more effective cooling of drive motor 33 of phosphor unit 30.

Lighting optical system 1 preferably includes third air-blowing apparatus 79 such as a fan that sends cooling air W4 to heat sink 74. Heat sink 74 can be cooled by cooling air W4 from third air-blowing apparatus 79. In addition, heat discharger 78 of heat exchanger 75 may be arranged between third air-blowing apparatus 79 and heat sink 74.

An example of the optical configuration of lighting optical system 1 is next described with reference to FIGS. 2 to 6 in particular. Blue laser light L1 that is emitted from first laser light source 10 is converted to parallel light by lens 12. Laser light L1 that has been converted to parallel light (collimated) by lens 12 is condensed at an irradiation-side opening of light tunnel 18 by condensing lens 14. Diffuser 16 that diffuses laser light may be provided between lens 14 and light tunnel 18.

Figure 6:
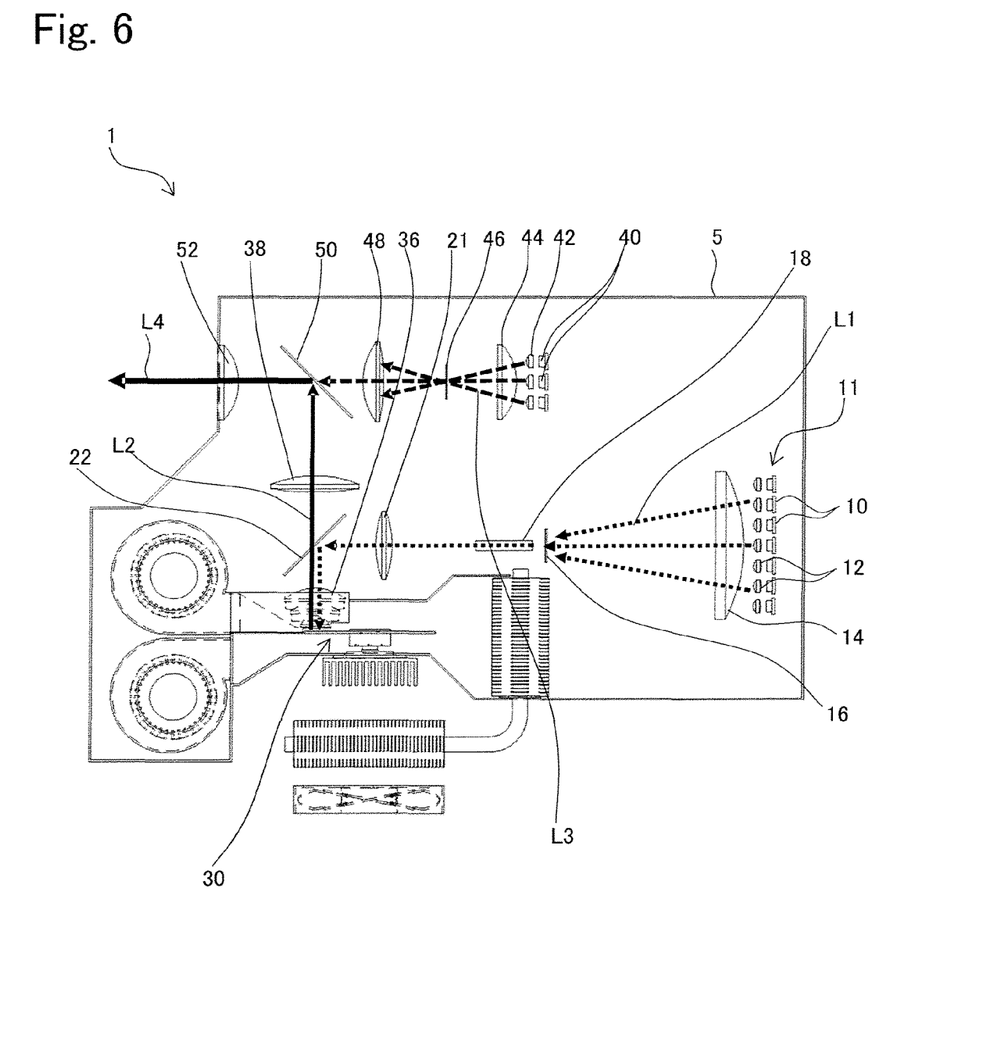
FIG. 6 is a schematic plan view showing the inner configuration of a lighting optical system.

Light tunnel 18 is a hollow optical element. The upper and lower, right and left inner surfaces of light tunnel 18 are reflecting mirrors. Laser light L1 that is irradiated into light tunnel 18 undergoes a plurality of reflections by the inner surfaces of the light tunnel, whereby the illuminance distribution of light at the emission portion of light tunnel 18 is made uniform. A glass rod (rod integrator) may be provided in place of light tunnel 18.

Laser light L1 that is emitted from light tunnel 18 passes through lens 21 and is then irradiated into dichroic mirror 22. This dichroic mirror 22 has the property of reflecting light having a blue wavelength and transmitting light having a wavelength longer than the green wavelength. Accordingly, blue laser light L1 that was emitted from first laser light source 10 is reflected at dichroic mirror 22. The blue laser light L1 that is reflected at dichroic mirror 22 passes through lens system 36 and is then irradiated into phosphor 31 of phosphor unit 30.

Phosphor 31 of the phosphor unit produces fluorescent light by the irradiation of laser light. In the present exemplary embodiment, phosphor 31 is used that radiates yellow fluorescent light that contains from red to green wavelengths. However, as described hereinabove, phosphor 31 is not limited to a substance that radiates yellow fluorescent light.

Yellow light L2 that is radiated from phosphor 31 passes through lens system 36 and dichroic mirror 22 in that order. Yellow light L2 that has passed through dichroic mirror 22 passes through lens 38 and is then irradiated into dichroic mirror 50.

This dichroic mirror 50 has the property of transmitting light having a blue wavelength and reflecting light of wavelengths longer than the green wavelength. As a result, dichroic mirror 50 reflects yellow light L2 that was emitted from phosphor 31.

Second laser light source 40 may be made up of a plurality of blue laser diodes arranged in a plane. The laser diodes radiate laser light from small light-emitting points having an extremely small area. Laser light L3 that is radiated from second laser light source 10 40 is made parallel (collimated) by lens 42 and is then condensed by first condensing lens 44.

Lighting optical system 1 may be provided with diffuser 46 that diffuses laser light L3 that is emitted from second laser light source 40. Diffuser 46 is arranged between first condensing lens 44 and second condensing lens 48. Diffuser 46 is preferably provided in the vicinity of the condenser of laser light that has passed through first condensing lens 44, i.e., in the vicinity of the focal point of first condensing lens 44.

The blue laser light L3 that has been diffused by diffuser 46 passes through second condensing lens 48 and is then irradiated into dichroic mirror 50. This blue laser light L3 passes through dichroic mirror 50. The blue laser light L3 that has passed through dichroic mirror 50 is synthesized with the yellow fluorescent light L2 that was reflected by dichroic mirror 50.

The synthesized light L4 that was synthesized by dichroic mirror 50, i.e., the synthesized light L4 of blue laser light and yellow fluorescent light, passes through condensing lens 52 and is then emitted to the outside of housing 6. The synthesized light L4 that is emitted from lighting optical system 1 is preferably in the form of white light that contains the blue wavelength, green wavelength, and red wavelength.

Because phosphor 31 of phosphor unit 30 is effectively cooled by the above-described cooling structure, a reduction of the light-emitting efficiency of phosphor 31 can be prevented. As a result, lighting optical system 1 having a high illuminance maintenance rate over time can be provided.

Lighting optical system 1 of the present invention is not limited to the above-described configuration. The present invention can be applied to any lighting optical system having a phosphor unit that contains a phosphor that emits fluorescent light by the irradiation of excitation light and the above-described cooling structure. The lighting optical system may be provided with a plurality of phosphor units. In this case, the above-described cooling structure should be provided corresponding to at least one phosphor unit.

Figure 7:
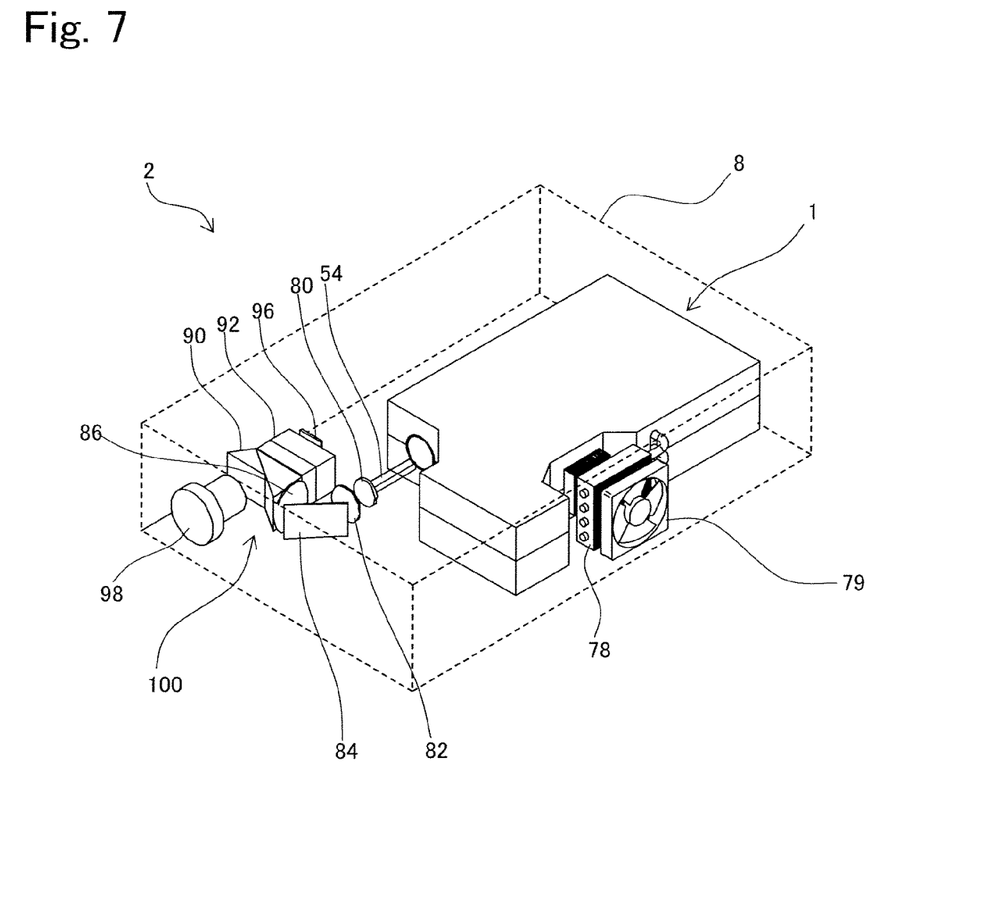
FIG. 7 is a schematic perspective view of a projection-type display apparatus provided with a lighting optical system.

An example of the configuration of a projection-type display apparatus that is provided with lighting optical system 1 is next described with reference to FIG. 7. Projection-type display apparatus 2 has housing 8 that accommodates each of the constituent elements. An opening should be formed in the portion of housing 8 in which third air-blowing apparatus 79 is provided to improve the flow of cooling air.

Projection-type display apparatus 2 includes optical engine 100 that converts light emitted from lighting optical system 1 to image light and projection lens 98 that projects the image light to the outside. Optical engine 100 may include TIR (Total Internal Reflection) prism 90, color prism 92, and digital mirror device (DMD) 96.

Light emitted from lighting optical system 1 is irradiated into integrator 54. Condensing lens 52 of lighting optical system 1 condenses the synthesized light L4 in integrator 54. Integrator 54 makes the illuminance distribution of the synthesized light uniform. Integrator 54 may be, for example, a light tunnel.

The light that has passed through integrator 54 is transmitted through lenses 80 and 82, reflected by mirror 84, and further transmitted through lens 86. The light that has been transmitted by lens 86 is irradiated into TIR prism 90. The light that is irradiated into TIR prism 90 undergoes total reflection inside the prism and is then irradiated into color prism 92.

Color prism 92 separates white light into green light, red light, and blue light. The green light that has been separated in color prism 92 is irradiated into green light digital mirror device (DMD) 96. Similarly, the red light is irradiated into red light DMD (not shown), and the blue light is irradiated into blue light DMD (not shown).

DMD 96 is a semiconductor projection device that is equipped with a multiplicity of micromirrors arranged in matrix form. Each micromirror corresponds to a pixel of the projected image. The angle of each micromirror can be adjusted. DMD 96 is able to adjust the quantity of light that is irradiated into projection lens 98 for each pixel. In this way, DMD 96 forms the image light that is to be projected. The image light that is formed in DMD 96 is projected onto a screen by projection lens 98.

A decrease in the light-emission efficiency of phosphor 31 can be prevented because phosphor 31 of phosphor unit 30 is efficiently cooled by the above-described cooling structure. As a result, projection-type display apparatus 2 that has a high illuminance maintenance rate over time can be provided.

Projection-type display apparatus 2 of the present invention is not limited to the device described hereinabove. Projection-type display apparatus 2 may be of any configuration as long as it is equipped with the above-described light source device. Optical engine 100 is also not limited to the above-described configuration and may be of any configuration.

Figure 8:
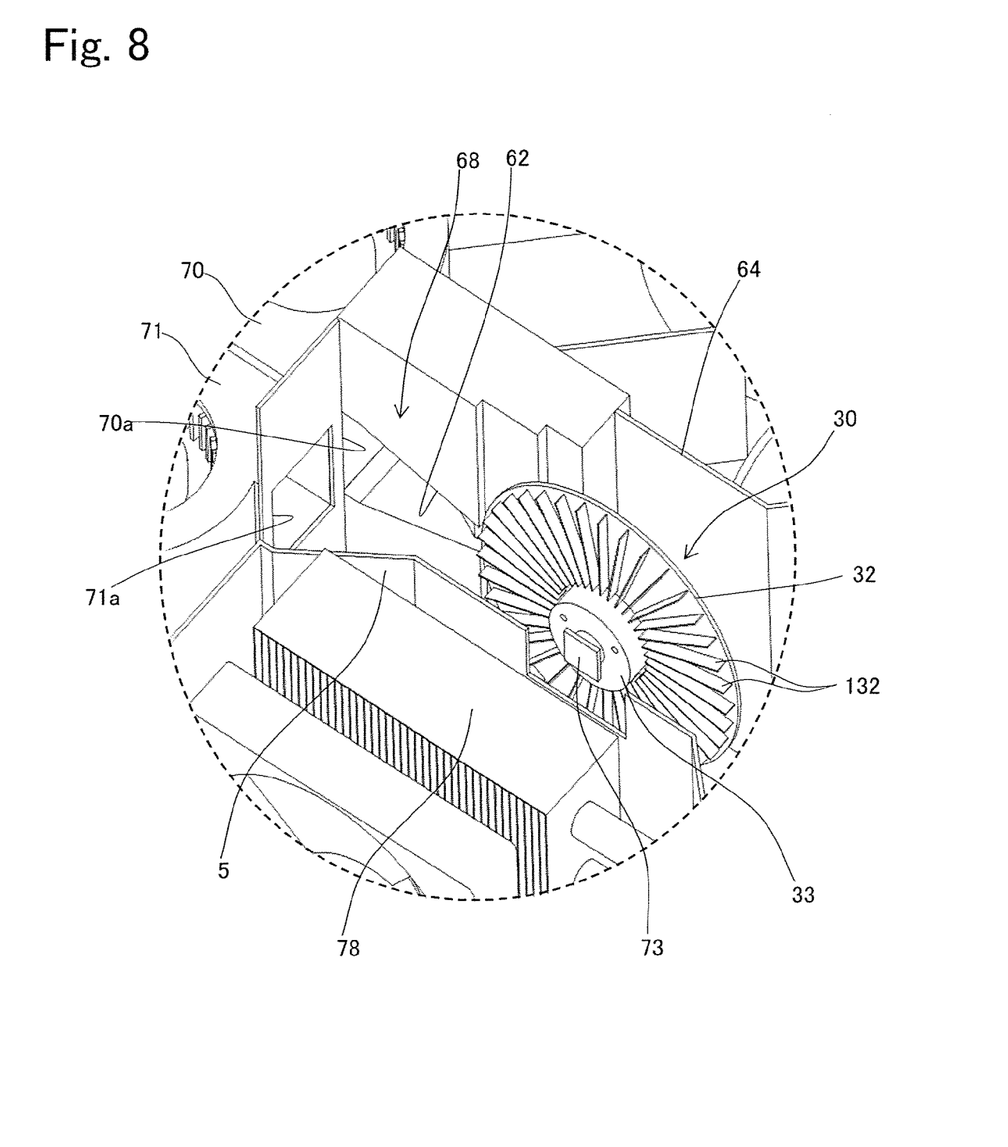
FIG. 8 is a perspective view showing a first modification of the phosphor unit in the lighting optical system.

FIG. 8 shows an example of a first modification of the phosphor unit in a lighting optical system. The configuration of this lighting optical system is similar to the above-described lighting optical system with the exception of the phosphor unit.

In the phosphor unit according to the first modification, fins 132 that increase the area of heat discharge are formed on the surface on the side of substrate 32 that is opposite to the surface on which phosphor 31 is formed.

Figure 9:
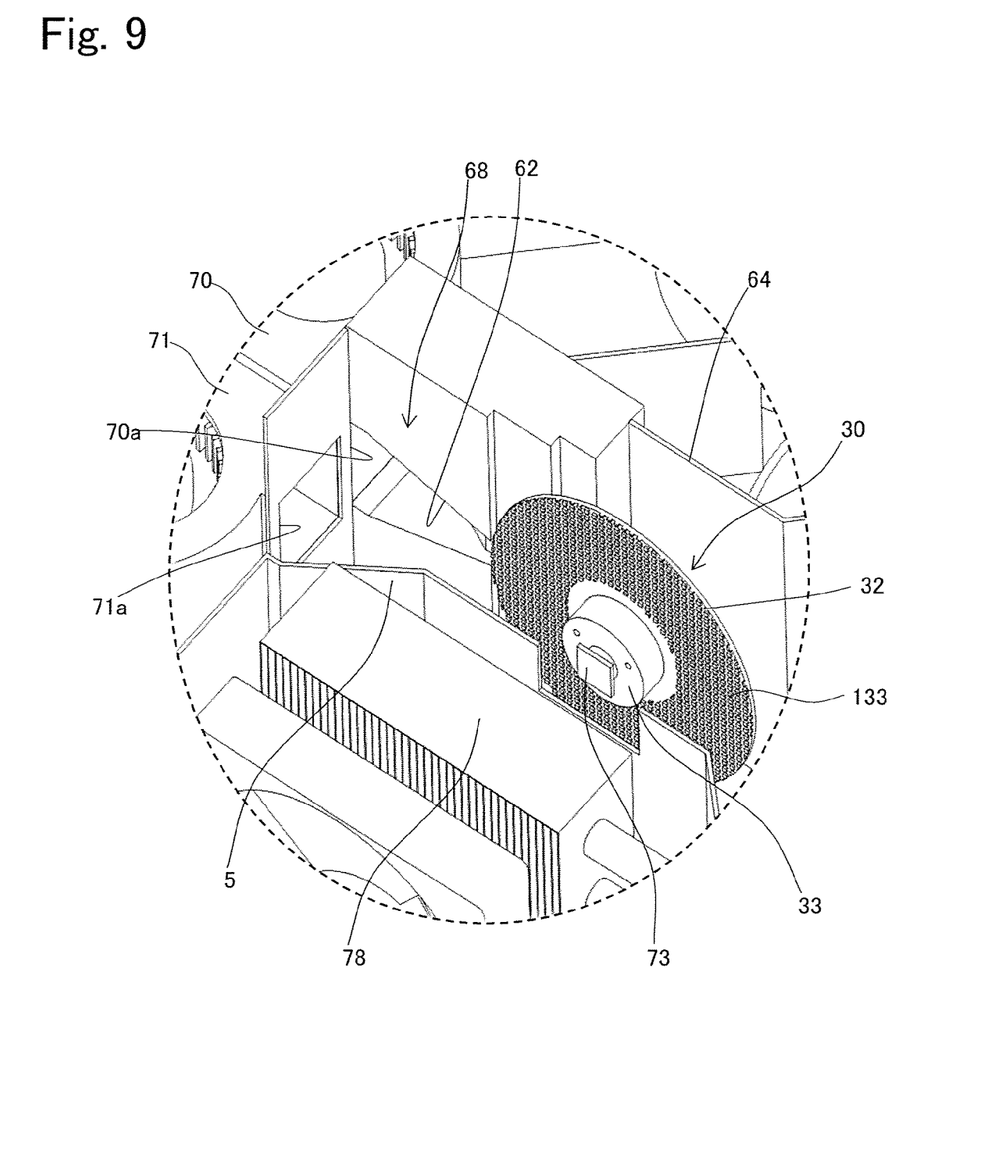
FIG. 9 is a perspective view showing a second modification of the phosphor unit in the lighting optical system.

FIG. 9 shows a second modification of the phosphor unit in a lighting optical system. The configuration of this lighting optical system is similar to the above-described lighting optical system with the exception of the phosphor unit.

In the phosphor unit of the second modification, protrusions 133 that increase the area of heat discharge are formed on the surface of substrate 32 that is opposite to the surface on which phosphor 31 is formed.

The cooling effect of phosphor unit 30 can be further improved by increasing the area of heat discharge of substrate 32 by means of fins 132 and protrusions 133 in the first and second modifications.

In addition, the cooling method of phosphor unit 30 or projection-type display apparatus 2 that uses the above-described cooling structure is also included within the range of the present invention. In relation to the already described exemplary embodiments, the present invention may include the cooling structure, the lighting optical system, the projection-type display apparatus, and the cooling method as described hereinbelow.

Note 1

A cooling structure has:
a phosphor unit that includes a substrate and a phosphor that is formed on the substrate and that emits fluorescent light by the irradiation of excitation light; an air-blowing system that causes cooling air to flow; and a duct structure that guides cooling air from the air-blowing system to the phosphor unit.

Note 2

In the cooling structure described in Note 1, the duct structure has a first flow path that guides cooling air from the air-blowing system to the surface of the substrate on which the phosphor is formed.

Note 3

In the cooling structure described in Note 2, the first flow path has a constricted portion in which the flow path width decreases with progression toward the irradiation spot of the excitation light on the phosphor.

Note 4

In the cooling structure described in any one of Notes 1 to 3, the duct structure has a second flow path that guides cooling air from the air-blowing system to a region on the side of the substrate that is opposite to the side on which the phosphor is formed.

Note 5

In the cooling structure described in Note 1, the duct structure has a first flow path that guides cooling air from the air-blowing system to the surface of the substrate on which the phosphor is formed and a second flow path that guides cooling air from the air-blowing system to a region on the side of the substrate that is opposite to the side on which the phosphor is formed.

Note 6

In the cooling structure described in Note 5, the first flow path has a constricted portion in which the flow path width decreases as it progresses toward the irradiation spot of the excitation light of the phosphor.

Note 7

In the cooling structure described in Note 5 or 6, the substrate forms a partition between the first flow path and the second flow path, the surface of the substrate on which the phosphor is formed facing the first flow path and the surface of the side of the substrate that is on the opposite side of the surface on which the phosphor is formed facing the second flow path.

Note 8

In the cooling structure described in any one of Notes 5 to 7, the air-blowing system has a first air-blowing apparatus that causes cooling air to flow in the first flow path and a second air-blowing apparatus that causes cooling air to flow in the second flow path.

Note 9

The cooling structure described in any one of Notes 4 to 8 has a drive motor that is provided in the second flow path and that drives the rotation of the substrate.

Note 10

The cooling structure described in Note 9 has:
a heat sink that is attached to the drive motor; and
a third air-blowing apparatus that blows cooling air against the heat sink.

Note 11

The cooling structure described in any one of Notes 1 to 10 has a heat exchanger that decreases the temperature of the cooling air that has been heated by the phosphor unit.

Note 12

In the cooling structure described in any one of Notes 1 to 11, fins or protrusions that increase the area of heat discharge are formed on the surface of the substrate that is opposite to the surface on which the phosphor is formed.

Note 13

In the cooling structure described in any one of Notes 1 to 12, the substrate of the phosphor unit is configured to freely rotate.

Note 14

In the cooling structure described in any one of Notes 1 to 13, the phosphor unit is disposed inside the duct structure.

Note 15

In the cooling structure described in Note 14, the duct structure has a window that allows the passage of the excitation light from outside the duct structure toward the phosphor unit.

Note 16

The cooling structure described in any one of Notes 1 to 15 has a housing that accommodates the duct structure and the air-blowing system;
wherein the cooling air is caused to circulate by causing the cooling air that flows from the duct structure to return to the air-blowing system inside the housing.

Note 17

A lighting optical system has:
the cooling structure described in any one of Notes 1 to 16; and
an excitation light source that generates excitation light that irradiates the phosphor.

Note 18

A projection-type display apparatus has:
the lighting optical system described in Note 17;
an optical engine that converts light emitted from the lighting optical system to image light; and projection lens that projects the image light to the outside.

Note 19

A cooling method that cools a phosphor unit that includes a substrate and a phosphor that is formed on the substrate and that emits fluorescent light by the irradiation of excitation light includes:

causing cooling air to strike against the phosphor unit by way of a duct structure that guides the cooling air from an air-blowing system to the phosphor unit.

Note 20

In the cooling method described in Note 19, the duct structure has a first flow path that guides cooling air from the air-blowing system to the surface of the substrate on which the phosphor is formed.

Note 21

In the cooling method described in Note 20, the first flow path has a constricted portion in which the width of the flow path decreases as it progresses toward the irradiation spot of the excitation light on the phosphor.

Note 22

In the cooling method described in any one of Notes 19 to 21, the duct structure has a second flow path that guides cooling air from the air-blowing system to a region on the side of the substrate that is opposite to the surface on which the phosphor is formed.

Note 23

In the cooling method described in Note 19, the duct structure has a first flow path that guides cooling air from the air-blowing system to the surface of the substrate on which the phosphor is formed and a second flow path that guides cooling air from the air-blowing system to a region on the side of the substrate that is opposite to the surface on which the phosphor is formed.

Note 24

In the cooling method described in Note 23, the first flow path has a constricted portion in which the width of the flow path decreases as it progresses toward the irradiation spot of the excitation light of the phosphor.

Note 25

In the cooling method described in Note 23 or 24:
the substrate forms a partition between the first flow path and the second flow path;
the surface of the substrate on which the phosphor is formed faces the first flow path; and
the surface of the substrate that is on the opposite side to the surface on which the phosphor is formed faces the second flow path.

Note 26

In the cooling method described in any one of Notes 23 to 25, the air-blowing system has a first air-blowing apparatus and a second air-blowing apparatus; and cooling air is caused to flow from the first air-blowing apparatus to the first flow path and cooling air is caused to flow from the second air-blowing apparatus to the second flow path.

Note 27

In the cooling method described in any one of Notes 22 to 26, the substrate is caused to rotate by a drive motor that is provided in the second flow path.

Note 28

In the cooling method described in Note 27, a heat sink is attached to the drive motor and cooling air from a third air-blowing apparatus is caused to blow against the heat sink.

Note 29

In the cooling method described in any one of Notes 19 to 28, the temperature of cooling air that has been heated in the phosphor unit is decreased by a heat exchanger.

Note 30

In the cooling method described in any one of Notes 19 to 29, fins or protrusions that increase the area of heat discharge are formed on the surface of the substrate that is opposite to the surface on which the phosphor is formed.

Note 31

In the cooling method described in any one of Notes 19 to 30, the substrate of the phosphor unit is configured to rotate freely.

Note 32

In the cooling method described in any one of Notes 19 to 31, the phosphor unit is disposed inside the duct structure.

Note 33

In the cooling method described in Note 32, the duct structure has a window that allows the passage of the excitation light from outside the duct structure toward the phosphor unit.

Note 34

In the cooling method described in any one of Notes 19 to 33, a housing is included that accommodates the duct structure and the air-blowing system, and the cooling air is caused to circulate by causing the cooling air that flows from the duct structure to return to the air-blowing system inside the housing.

Although preferable exemplary embodiments of the present invention have been presented and described in detail hereinabove, the present invention is not limited to the above-described exemplary embodiments, and it should be understood that the present invention is open to various modifications and amendments that do not depart from the gist of the invention.

EXPLANATION OF REFERENCE NUMBERS 1 lighting optical system
2 projection-type display apparatus
6 housing
10 first laser light source
11 excitation light source
30 phosphor unit
31 phosphor
32 substrate
33 drive motor
60 first flow path
61 second flow path
62 constricted portion
63 partition member
64 external wall
65 window
68 duct structure
70 first air-blowing apparatus
71 second air-blowing apparatus
73 heat-conductive sheet
74 heat sink
75 heat exchanger
79 third air-blowing apparatus
98 projection lens
100 optical engine
132 fins
133 protrusions

What is claimed is:

1. A cooling structure, comprising:
a phosphor unit that includes a substrate and a phosphor that is formed on said substrate and that emits fluorescent light by irradiation of excitation light;
an air-blowing system that causes cooling air to flow;
a duct structure that guides the cooling air from said air-blowing system to said phosphor unit,
wherein said duct structure includes a first flow path that guides the cooling air from said air-blowing system to a surface of said substrate on which said phosphor is formed and a second flow path that guides the cooling air from said air-blowing system to a region on a side of said substrate that is opposite to the surface on which said phosphor is formed;
a heat exchanger that decreases a temperature of the cooling air that has been heated in said phosphor unit; and
a plate-shaped partition member that forms a partition between said first flow path and said second flow path,
wherein a width of said first flow path that guides the cooling air from said air-blowing system to the surface of said substrate is less than a width of said second flow path that guides the cooling air from said air-blowing system to the region on the side of said substrate that is opposite to the surface on which said phosphor is formed.

2. A lighting optical system, comprising:
the cooling structure as set forth in claim 1; and
an excitation light source that emits excitation light that irradiates said phosphor.

3. A projection-type display apparatus, comprising:
the lighting optical system as set forth in claim 2;
an optical engine that converts light emitted from said lighting optical system to image light; and
a projection lens that projects said image light to outside.

4. The cooling structure as set forth in claim 1, wherein said first flow path extends from said air-blowing system toward one end of said substrate.

5. The cooling structure as set forth in claim 1, wherein said partition member approaches one end of said substrate.

6. The cooling structure as set forth in claim 1, wherein said phosphor unit is disposed inside said duct structure.

7. The cooling structure as set forth in claim 1, wherein said first flow path includes a constricted portion in which a flow path width decreases as the first flow path progresses toward an irradiation spot of said excitation light of said phosphor.

8. The cooling structure as set forth in claim 1, further comprising:
a heat sink; and
another air-blowing system that causes the cooling air to blow against said heat sink.

9. A cooling structure, comprising:
a phosphor unit that includes a substrate and a phosphor that is formed on said substrate and that emits fluorescent light by irradiation of excitation light;
an air-blowing system that causes cooling air to flow;
a duct structure that guides the cooling air from said air-blowing system to said phosphor unit,
wherein said duct structure includes a first flow path that guides the cooling air from said air-blowing system to a surface of said substrate on which said phosphor is formed and a second flow path that guides the cooling air from said air-blowing system to a region on the side of said substrate that is opposite to the surface on which said phosphor is formed, and
wherein said phosphor unit is disposed inside said duct structure; and
a plate-shaped partition member that forms a partition between said first flow path and said second flow path,
wherein a width of said first flow path that guides the cooling air from said air-blowing system to the surface of said substrate is less than a width of said second flow path that guides the cooling air from said air-blowing system to the region on the side of said substrate that is opposite to the surface on which said phosphor is formed.

10. The cooling structure as set forth in claim 9, wherein said first flow path includes a constricted portion in which a flow path width decreases as it progresses toward an irradiation spot of said excitation light of said phosphor.

11. The cooling structure as set forth in claim 10, wherein an end of said constricted portion is directed toward the irradiation spot of said excitation light.

12. The cooling structure as set forth in claim 9, further comprising:
a drive motor that is provided in said second flow path and that drives a rotation of said substrate.

13. The cooling structure as set forth in claim 12, further comprising:
a heat sink that is attached to said drive motor, and
another air-blowing system that causes the cooling air to blow against said heat sink.

14. The cooling structure as set forth in claim 9, further comprising:
a heat exchanger that decreases a temperature of said cooling air that has been heated in said phosphor unit.

15. The cooling structure as set forth in claim 9, wherein said first flow path extends from said air-blowing system toward one end of said substrate.

16. A cooling method for cooling a phosphor unit that contains a substrate and a phosphor that is formed on said substrate and that produces fluorescent light by irradiation of excitation light, the method comprising:
directing cooling air against said phosphor unit by way of a duct structure that guides the cooling air from an air-blowing system to said phosphor unit; and
guiding, through a first flow path, the cooling air to a surface of said substrate on which said phosphor is formed, and guiding, through a second flow path, the cooling air to a region on a side of said substrate that is opposite to the surface on which said phosphor is formed,
wherein said phosphor unit is disposed inside said duct structure,
wherein a plate-shaped partition member forms a partition between said first flow path and said second flow path, and
wherein a width of said first flow path that guides the cooling air from said air-blowing system to the surface of said substrate is less than a width of said second flow path that guides the cooling air from said air-blowing system to the region on the side of said substrate that is opposite to the surface on which said phosphor is formed.

17. The cooling method as set forth in claim 16, further comprising:
decreasing, in a heat exchanger, a temperature of the cooling air that has been heated in said phosphor unit.

* * * * *